F. M. & W. BUSH.
Potato Harvesters.

No. 151,836.

Patented June 9, 1874.

Witnesses.
Henry Eichling.
Fred Haynes.

Frank M. Bush, Inventors
Washington Bush,
by their Attorney
Thom A. Allen

UNITED STATES PATENT OFFICE.

FRANK M. BUSH AND WASHINGTON BUSH, OF PERRY CENTER, MICHIGAN.

IMPROVEMENT IN POTATO-HARVESTERS.

Specification forming part of Letters Patent No. 151,836, dated June 9, 1874; application filed April 20, 1874.

*To all whom it may concern:*

Be it known that we, FRANK M. BUSH and WASHINGTON BUSH, of Perry Center, in the county of Shiawassee and State of Michigan, have invented an Improved Potato-Harvester, of which the following is a specification:

This invention relates to a potato digger or harvester, in which the potatoes are unearthed and delivered to an oscillating screen or sieve; and the invention consists in a peculiar construction and arrangement of parts, whereby a cutting device is actuated and the screen oscillated from a single crank-shaft, as hereinafter described and claimed.

Figure 1:
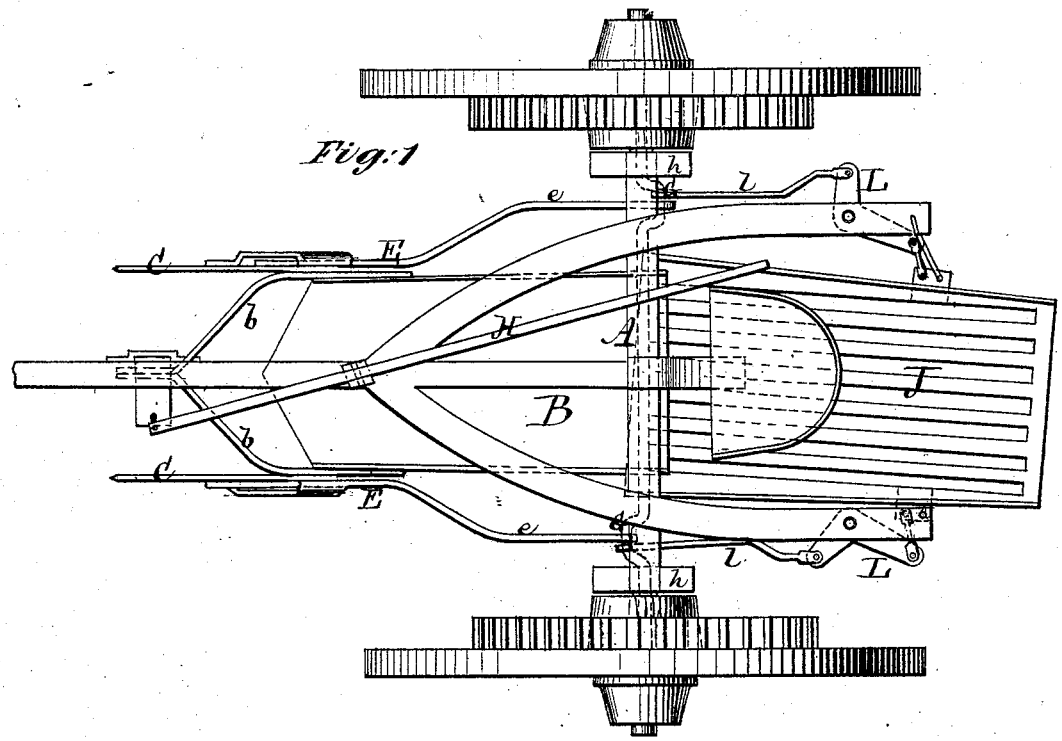
Figure 2:
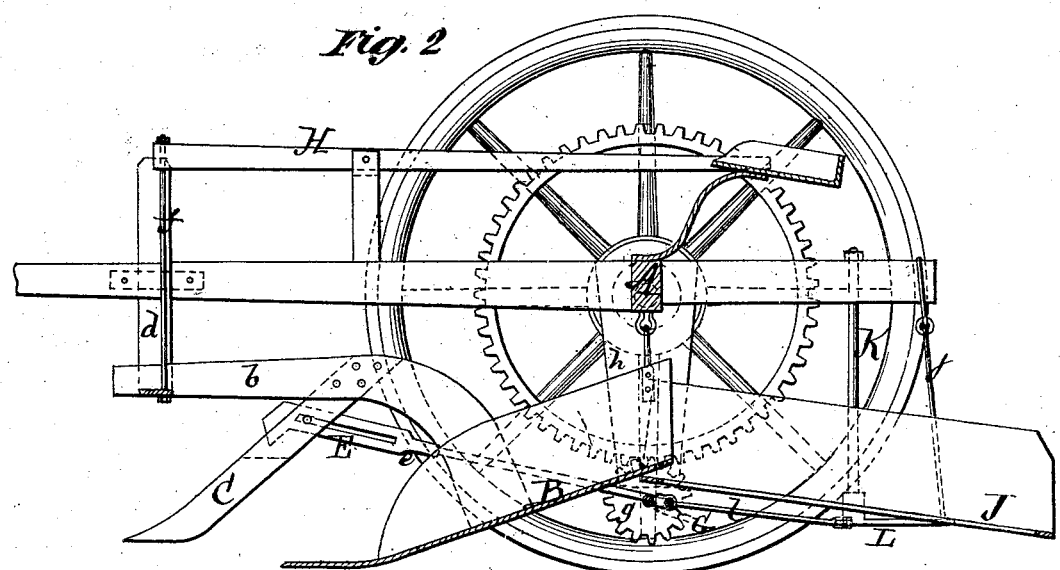

In the accompanying drawing, Figure 1 is a top view of our invention. Fig. 2 is a longitudinal vertical section.

The wheels, axle, hounds, and tongue of the machine may be of any ordinary suitable construction and material. From the under side of the axle A is suspended, by pivot-bearings, the scraper B, which may be made of steel or of iron faced with steel. The pivot-bearings are at the rear end of the scraper, and from the upper and forward portions of its sides extend bars $b$ $b$, which meet at a point over and forward of the front edge of the scraper, and are attached to a vertical bar, $d$, which passes up through a slot in the tongue, or behind a strap or keeper attached thereto. To the bars $b$ $b$ are attached colters C C, for parting the turf in advance of the scraper B. These colters are formed with slots, in which work the front ends of hooked cutters E, the rear ends of which are connected by rods $e$ with a crank-shaft, G, journaled in hangers $h$ depending from the axle, and carrying on its ends pinions $g$, driven by gearing on the wheels of the machine. The front ends of the bars $b$ are connected by a rod, $f$, with a lever, H, pivoted in a standard on the upper side of the tongue or hounds. Immediately in rear of the scraper B is a sieve, J, which is pivoted at its front end to the rear end of the scraper, and suspended at its rear end from the hounds by means of rods $j$. The rear portion is connected on each side with one arm of an elbow-lever, L, having its fulcrum at the lower end of a rod, K, depending from the hounds, the other arm being connected by a rod, $l$, with the crank-shaft G. This sieve may be made all in one piece of metal or other material, or it may be composed of wooden bars connected with an iron frame, or vice versa.

When the machine is in operation, the revolution of the crank-shaft G gives a reciprocating motion to the cutters E, so that as the colters C part the turf and gather the tops, the cutters E, acting in connection with the colters, cut off the tops and prevent clogging of the parts. As the machine advances, the scraper B unearths the potatoes and conveys them to the sieve J, which is oscillated by the revolution of the crank-shaft, so as to sift the soil and rubbish from the potatoes, and deposit them upon the surface in its rear. The depth of the scraper in the soil may be regulated, or it may be raised entirely from contact with the ground, by means of the hand-lever H.

What we claim as our invention, and desire to secure by Letters Patent, is—

The combination, in a potato-digger, of the crank-shaft G, rods $e$, cutters E, and colters C, with the bell-crank lever L and sieve J, the whole being constructed substantially as described, whereby the crank-shaft reciprocates the cutters and oscillates the sieve, as set forth.

FRANK M. BUSH.
WASHINGTON BUSH.

Witnesses:
JOHNSON WILSON,
ALANSON J. McCARN.